US012427004B2

(12) United States Patent
Adams

(10) Patent No.: US 12,427,004 B2
(45) Date of Patent: Sep. 30, 2025

(54) HAND HELD DENTAL FLOSSING DEVICE AND METHOD OF OPERATING THE SAME

(71) Applicant: Mark Adams, Arlington, WA (US)

(72) Inventor: Mark Adams, Arlington, WA (US)

( * ) Notice: Subject to any disclaimer, the term of this patent is extended or adjusted under 35 U.S.C. 154(b) by 0 days.

(21) Appl. No.: 18/394,692

(22) Filed: Dec. 22, 2023

(65) Prior Publication Data

US 2025/0205027 A1    Jun. 26, 2025

(51) Int. Cl.
*A61C 15/04* (2006.01)

(52) U.S. Cl.
CPC ......... *A61C 15/047* (2013.01); *A61C 15/043* (2013.01); *A61C 15/048* (2013.01)

(58) Field of Classification Search
CPC .... A61C 15/046; A61C 15/047; A61C 15/048
USPC ........................................ 132/323, 324, 325
See application file for complete search history.

(56) References Cited

U.S. PATENT DOCUMENTS

| | | | | |
|---|---|---|---|---|
| 2,381,530 A | * | 8/1945 | Dembenski | A61C 15/046 132/325 |
| 3,340,881 A | * | 9/1967 | Cowan | A61C 15/046 132/325 |
| 3,534,745 A | * | 10/1970 | Waters | A61C 15/047 D28/68 |
| 5,232,002 A | * | 8/1993 | McClallen | A61C 15/046 132/324 |
| 7,637,267 B2 | * | 12/2009 | Chang | A61C 15/046 132/323 |

FOREIGN PATENT DOCUMENTS

CN         111658206 A    *   9/2020

OTHER PUBLICATIONS

Clarivate Analytics translation of CN-111658206-A (Year: 2020).*

* cited by examiner

*Primary Examiner* — Thomas C Barrett
*Assistant Examiner* — Jennifer P Connell
(74) *Attorney, Agent, or Firm* — Novel Patent Services LLC

(57) ABSTRACT

A hand-held dental flossing device facilitates a user to control feed and tension of a dental floss during the flossing of teeth. The hand-held dental flossing device comprises a body having a handle, a head with plurality of arms, and a floating platform. The plurality of arms comprises one or more closed loops to facilitate a passage of a dental floss. The floating platform comprises a first spool, and a second spool. The first spool is configured for unwinding the dental floss for discharging upon rotation by a user. The second spool is adapted to wind a used portion of the dental floss upon rotation of the first spool and the second spool simultaneously by the user. The hand-held dental flossing device enables the user to control the tension of the dental floss at various modes by operating the first spool and the second spool.

19 Claims, 12 Drawing Sheets

HAND HELD DENTAL FLOSSING DEVICE AND METHOD OF OPERATING THE SAME

FIELD OF THE INVENTION

The present disclosure relates generally to the field of oral hygiene, and more particularly to a hand-held dental flossing device that is provided with a floating platform, which facilitates a user to control feed and tension of a dental floss during the flossing of teeth.

BACKGROUND

Dental flossing process is an important part of oral hygiene. The dental flossing process uses dental floss to remove plaque and food particles between teeth, where your toothbrush can't reach. Plaque is a sticky film of bacteria that can build up on your teeth and cause cavities and gum disease. The dental flossing helps in preventing cavities, gum disease, and bad breath.

The use of the dental floss is considered to be of great importance in the exercise of healthy dental hygiene. Dentists recommend at least daily use of the dental floss in conjunction with brushing to promote healthy teeth and gums. Because of the difficulty and discomfort of flossing the teeth, many flossing devices have been developed in the prior art.

A first class of such prior art devices includes non-motorized flossing stationary flossing devices. For example, the dental cleansing device shown in U.S. Pat. No. 5,094,256 to Barth ("Barth") includes a fork-shaped device having two arms extending from the distal end of a shaft. One end of a length of dental floss is fastened to the shaft. From the shaft, the floss is strung through an aperture in one arm, through an aperture in a second, and strung down to and fastened to the shaft at the other end. The floss is strung tightly between the two fastening points to provide a tight length of floss between the arms of the device. The user then holds the operative end of the shaft and positions the tight length of the shaft between the abutting teeth. The user causes cleansing action to take place by moving the shaft in a reciprocating manner, which movement is directly translated to the floss.

The drawback of this and similar devices is that only a small length of the floss between the arms is available for cleansing at any one time and gets dirty and worn quickly, requiring constant restringing. The major drawback is the floss stretches and becomes loose. Furthermore, the floss is more likely to shred and break, and the reciprocating motion of the arms within the mouth can cause the arms to hit and irritate the gums and cheeks.

Various dental floss holders have been developed to facilitate holding and tensioning the dental floss and to facilitate the urging of dental floss between the teeth. Although in the prior art some dental floss holders were of disposable design, reusable dental floss holders utilizing commonly available dental floss are more often cost-effective. Of the currently more popular reusable dental floss holders, which are of low-cost construction and use widely available dental floss, most have a pair of spaced arms at the end of a supporting handle. A length of dental floss is strung between the ends of the spaced arms, which have floss-receiving notches at their terminal ends.

The dental floss holders have only limited success commercially for a number of reasons, often including inadequate securing and/or tensioning of the dental floss, a design not easily maneuvered in the back of the mouth, a design wasteful of dental floss, and/or a design with too much bulk and discomfort in use. Further, some prior art dental floss holders that use commonly available dental floss material require tie-down, knotting, loop-making, or other special treatment of one or both of the dental floss ends.

While these dental floss holders may be suitable for the particular purpose they address, they are not as suitable for allowing an individual to floss their teeth with only one hand and without positioning their fingers within their mouth during flossing. Conventional dental floss devices are difficult to utilize and require both hands to properly operate.

Therefore, there is a need for a hand-held dental flossing device that is provided with a floating platform, which facilitates a user to control feed and tension of the floss during the flossing process. There is also a need for a hand-held dental flossing device that uses a non-linear spring, which facilitates the user in setting different tension levels of the floss. There is also a need for a hand-held dental flossing device that is simple to load and replace with one or more spools. There is also a need for a hand-held dental flossing device that provides the ability to compensate for any stretching of the floss around a closed loop. There is also a need for a hand-held dental flossing device that maintains constant tension on the floss while feeding a new segment of floss. There also a need for a hand-held dental flossing device that can be operated by using a single hand.

SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key nor critical elements of all embodiments, nor delineate the scope of any or all embodiments.

The present disclosure, in one or more embodiments, relates to a hand-held dental flossing device that is provided with a floating platform, which facilitates a user to control feed and tension of a dental floss during the flossing of teeth.

In one embodiment herein, the hand-held dental flossing device comprises a body, a head, and a floating platform. In one embodiment herein, the body having a handle. In specific, the handle having at least one of straight, curved or U-shaped structures. In specific, the handle is a split-handle. The handle is configured to provide grip to the user for holding while using the hand-held dental flossing device. The handle comprises a scale, which facilitates the user to adjust the tension of the dental floss at various levels. The scale includes a minimum tension mode, a nominal tension mode, and a maximum tension mode.

In one embodiment herein, the head with plurality of arms pivotally affixed to an end of the handle. In specific, the plurality of arms comprises one or more closed loops to facilitate a passage of a dental floss, which is used for flossing of teeth. In specific, the plurality of arms is made of at least one material includes stainless-steel. The plurality of arms is coated with silicone, which provides comfort to the user during the flossing of teeth.

In one embodiment herein, the floating platform is configured to movably position to the handle through an axle, thereby providing support for the floating platform by the handle. The floating platform comprises a case member, a first spool and a second spool.

In one embodiment herein, the case member is defining a chamber. In one embodiment herein, the first spool is rotatably mounted on the axle at one side within the chamber. The first spool is configured for unwinding the dental floss for discharging the new floss upon rotation by a user. The direction of rotation of the first spool is limited to unwind the dental floss by use of the ratchet pawl or equivalent approach. In embodiment herein, the second spool is rotatably mounted on the axle at another side within the chamber. The second spool is adapted to secure a free end of the dental floss received from the first spool through the one or more closed loops and wind a used portion of the dental floss upon rotation of the first spool and the second spool simultaneously by the user.

The first spool and the second spool are rotatably connected to each other on the axle through a clutch system, thereby controlling a tension of the dental floss at the head where the user flossing the teeth upon rotation of the first spool and the second spool, respectively. In specific, the clutch system is connected to a ratchet pawl or equivalent, which is used to limit rotational motion of the at least one of the first spool and the second spool in a direction while setting the tension of the dental floss. In particular, each of the first spool and the second spool comprise a knurled disc, which facilitates the user to rotate and hold the first spool and the second spool. The knurled disc of the first spool and the second spool is protruded from the case member.

The floating platform is adapted to move through the handle towards the head against an elastic member mounted on an outer surface of the handle when the user increasing and decreasing the tension of the dental floss at the head by rotating the second spool and holding the first spool, and by rotating the first spool and holding the second spool. The floating platform comprises a clip fastener, which is configured to hold the first spool, the clutch system, and the second spool together on the axle by applying pressure on both sides of the floating platform. The clip fastener is configured to apply an engagement force on the clutch system, thereby allowing turning or slipping torque within an acceptable range.

In one embodiment herein, the floating platform is detachably positioned to the handle, thereby allowing the user to simply load and replace the first spool with the dental floss and the second spool. The elastic members that are configured to provide and maintain an equal tension of the dental floss at the head of the hand-held dental flossing device, thereby preventing tangling of the dental floss. The elastic members are non-linear springs.

In another embodiment herein, the hand-held dental flossing device comprises a body, a floating platform, and a head. In one embodiment herein, the body having a handle with a groove. The head is configured with plurality of arms pivotally affixed to an end of the handle. The handle comprises a scale, which facilitates the user to adjust the tension of the dental floss at various levels. The scale includes a minimum tension mode, a nominal tension mode, and a maximum tension mode.

In one embodiment herein, the plurality of arms comprises one or more closed loops to facilitate a passage of a dental floss, which is used for flossing of teeth. The plurality of arms is made of at least one material includes stainless-steel. The plurality of arms is coated with silicone, which provides comfort to the user during the flossing of teeth.

In one embodiment herein, the floating platform is configured to movably position on the handle through an axle via the groove, thereby providing support for the floating platform by the handle. In one embodiment herein, the floating platform comprises a first spool, and a second spool.

In one embodiment herein, the floating platform comprises a clip fastener, which is configured to hold the first spool, the clutch system, and the second spool together on the axle by applying pressure on both sides of the floating platform. The floating platform is detachably positioned on the handle, thereby allowing the user to simply load and replace the first spool with the dental floss and the second spool.

In one embodiment herein, the first spool is rotatably mounted on the axle at one side of the handle. The first spool is configured for unwinding the dental floss for discharging the new floss upon rotation by a user. The second spool is rotatably mounted on the axle at another side of the handle. The second spool is adapted to secure a free end of the dental floss received from the first spool through the one or more closed loops and wind a used portion of the dental floss upon rotation of the first spool and the second spool simultaneously by the user.

In one embodiment herein, each of the first spool and the second spool comprise a knurled disc, which facilitates the user to manually rotate and hold the first spool and the second spool. Each of the knurled disc of the first spool and the second spool enable user to grip and rotate the first spool and the second spool.

In one embodiment herein, the first spool and the second spool are rotatably connected to each other on the axle through the clutch system, thereby controlling the tension of the dental floss at the head where the user flossing the teeth upon rotation of the first spool and the second spool, respectively.

In one embodiment herein, the clutch system is a slipper clutch. The clutch system is connected to a ratchet pawl, which is used to limit rotational motion of the at least one of the first spool and the second spool in a direction while setting the tension of the dental floss.

In one embodiment herein, the floating platform is adapted to move through the groove of the handle towards the head against an elastic member disposed within the groove when the user increasing and decreasing the tension of the dental floss at the head by rotating the second spool and holding the first spool, and by rotating the first spool and holding the second spool.

In one embodiment herein, the elastic member is configured to provide and maintain an equal tension of the dental floss at the head of the hand-held dental flossing device, thereby preventing shedding and tangling of the dental floss. In one embodiment herein, the elastic member is a spring. The hand-held dental flossing device enables the user to control the tension of the dental floss at various modes by operating the first spool and the second spool.

An embodiment of the first aspect, the invention provides a method for operating the hand-held dental flossing device for flossing of teeth. At one step, the user rotates the knurled disc of the first spool and the second spool for discharging a length of the dental floss from the first spool and guiding the dental floss to the second spool through the head for performing flossing of teeth.

At another step, the user controls the tension of the dental floss by moving the floating platform towards the head against the elastic member when the user increases and decreases the tension of the dental floss by rotating the second spool and holding the first spool, and by rotating the first spool and holding the second spool, respectively.

Further at other step, the hand-held dental flossing device enables the user to control the tension of the dental floss at various modes by operating the first spool and the second spool, thereby maintaining equal tension of the dental floss and preventing the dental floss from tangling and shedding during flossing of teeth.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

The accompanying drawings, which are incorporated in and constitute a part of the specification, illustrate an embodiment of the invention, and, together with the description, explain the principles of the invention.

DETAILED DESCRIPTION

Figure 1A:
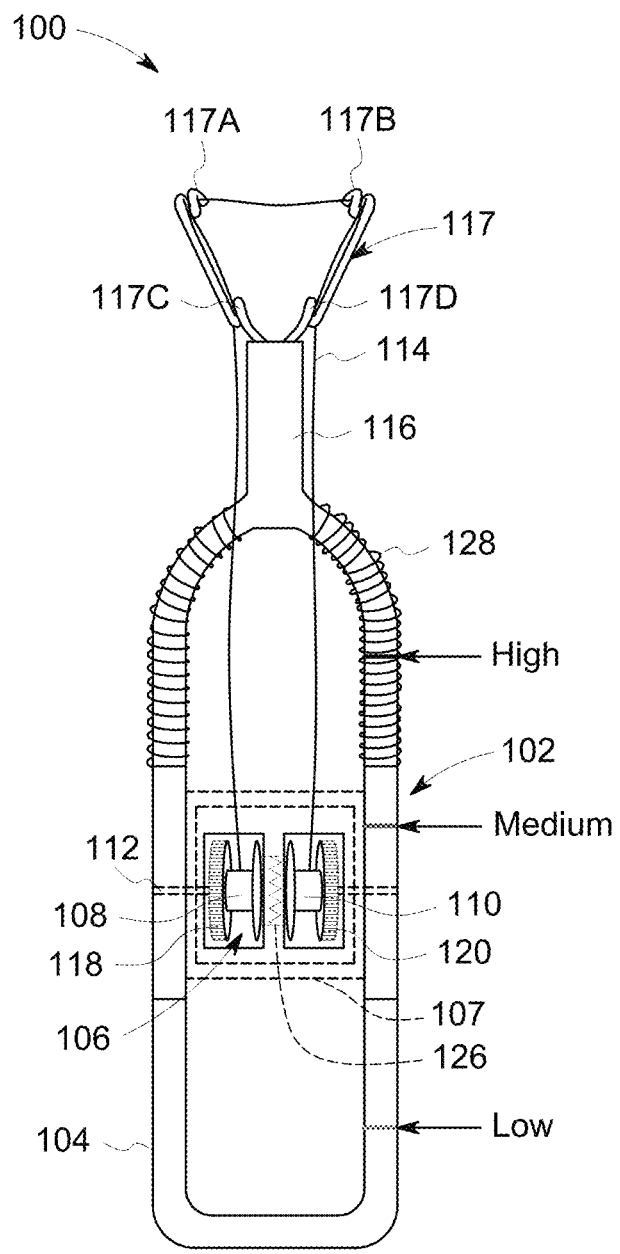
FIG. 1A illustrates a front view of a hand-held dental flossing device, in accordance with embodiments of the invention.

Reference will now be made in detail to the present preferred embodiments of the invention, examples of which are illustrated in the accompanying drawings. Wherever possible, the same reference numerals are used in the drawings and the description to refer to the same or like parts.

FIG. 1A refers to a front view of a hand-held dental flossing device 100. The hand-held dental flossing device 100 is provided with a floating platform 106, which facilitates a user to control the feed and tension of a dental floss 114 during the flossing process. The hand-held dental flossing device 100 that uses a non-linear spring, which facilitates the user in setting different tension levels of the dental floss 114. The hand-held dental flossing device 100 is simple to load and replace with one or more spools. The hand-held dental flossing device 100 provides the ability to compensate for any stretching of the dental floss 114 around one or more closed loops (117A, 117B, 117C, 117D). The hand-held dental flossing device 100 maintains constant tension on the dental floss 114 while feeding a new segment of the dental floss 114. The hand-held dental flossing device 100 can be operated by using a single hand.

In one embodiment herein, the hand-held dental flossing device 100 comprises a body 102, a head 116, and a floating platform 106. In one embodiment herein, the body 102 is provided with a handle 104. In some embodiments herein, the handle 104 having at least one of straight, curved or U-shaped structures. In specific, the handle 104 having a U-shaped structure. In one embodiment herein, the handle 104 comprises a scale, which facilitates the user to adjust the tension of the dental floss 114 at various levels (high, medium, low). The scale includes a minimum tension mode, a nominal tension mode, and a maximum tension mode.

In one embodiment herein, the head 116 with plurality of arms 117 pivotally affixed to an end of the handle 104. In one embodiment herein, the handle 104 is a split-handle. The handle 104 is configured to provide grip to the user for holding while using the hand-held dental flossing device 100. The plurality of arms 117 comprises one or more closed loops 117A, 117B, 117C, 117D to facilitate a passage of a dental floss 114, which is used for flossing of teeth. In one embodiment herein, the plurality of arms 117 is made of at least one material includes stainless-steel. The plurality of arms 117 is coated with silicone, which provides comfort to the user during the flossing of teeth.

In one embodiment herein, the floating platform 106 is configured to movably position to the handle 104 through an axle 112, thereby providing support for the floating platform 106 by the handle 104. The first spool 108 and the second spool 110 are rotatably connected to each other on the axle 112 through a clutch system 126 The floating platform comprises a case member 107 defining a chamber, a first spool 108, and a second spool 110. The first spool is rotatably mounted on the axle 112 at one side within the chamber. The first spool 108 is configured for unwinding the dental floss 114 for discharging the new floss upon rotation by a user.

In one embodiment herein, the floating platform 106 is detachably positioned to the handle 104, thereby allowing the user to simply load and replace the first spool 108 with the dental floss 114 and the second spool 110.

In one embodiment herein, the second spool 110 is rotatably mounted on the axle 112 at another side within the chamber. The second spool 110 is adapted to secure a free end of the dental floss 114 received from the first spool 108 through the one or more closed loops (117A, 117B, 117C, 117D) and wind a used portion of the dental floss 114 upon rotation of the first spool 108 and the second spool 110 simultaneously by the user.

In one embodiment herein, each of the first spool 108 and the second spool 110 comprise a knurled disc (118, 120), which facilitates the user to rotate and hold the first spool 108 and the second spool 110. Each of the knurled disc (118, 120) of the first spool 108 and the second spool 110 is protruded from the case member 107.

In one embodiment, the floating platform 106 is adapted to move through the handle 104 towards the head 116 against an elastic member 128 mounted on an outer surface of the handle when the user increasing and decreasing the tension of the dental floss 114 at the head 116 by rotating the second spool 110 and holding the first spool 108, and by rotating the first spool 108 and holding the second spool 110. In one embodiment herein, the elastic members 128 are configured to provide and maintain an equal tension of the dental floss 114 at the head 116 of the hand-held dental flossing device 100, thereby preventing tangling of the dental floss 114, the elastic members 128 are non-linear springs. When the elastic members 128 are fully extended in a relaxed state the floating platform 106 is farthest away from the head 116. At this point the tension of the dental floss 114 will be low. When the elastic members 128 are fully compressed and the floating platform 106 is closest to the head 116, then the tension of the dental floss 114 will be the high. The hand-held dental flossing device 100 enables the user to control the tension of the dental floss 114 at various modes by operating the first spool 108 and the second spool 110.

Figure 1B:
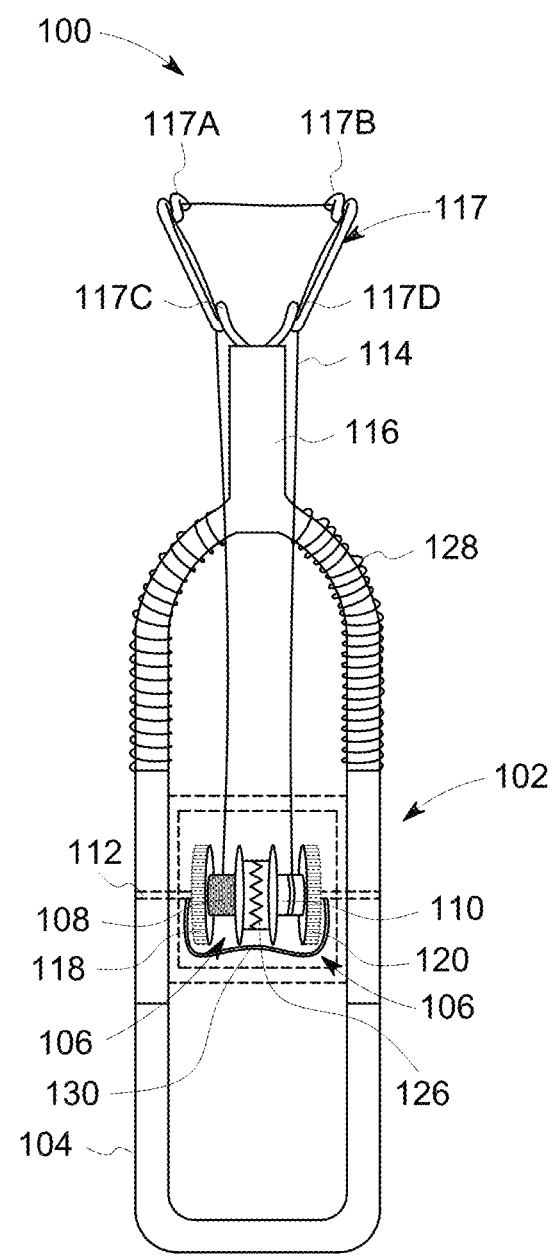
FIG. 1B illustrates a back view of the hand-held dental flossing device, in accordance with embodiments of the invention.

FIG. 1B refers to a back view of the hand-held dental flossing device 100. In one embodiment herein, each of the first spool 108 and the second spool 110 comprise a knurled disc (118, 120), which facilitates the user to rotate and hold the first spool 108 and the second spool 110. Each of the knurled disc (118, 120) of the first spool 108 and the second spool 110 is protruded from the case member 107.

In one embodiment herein, the first spool 108 and the second spool 110 are rotatably connected to each other on the axle 112 through a clutch system 126, thereby controlling a tension of the dental floss 114 at the head 116 where the user flossing the teeth upon rotation of the first spool 108 and the second spool 110, respectively.

The floating platform 106 comprises a clip fastener 130, which is configured to hold the first spool 108, the clutch system 126, and the second spool 110 together on the axle 112 by applying pressure on both sides of the floating platform 106. In one embodiment herein, the clutch system 126 is a slipper clutch. The clip fastener 130 is configured to apply an engagement force on the clutch system 126, thereby allowing turning or slipping torque within an acceptable range. The clutch system 126 is connected to a ratchet pawl 127 (as shown in FIG. 3B), which is used to limit rotational motion of the at least one of the first spool 108 and the second spool 110 in a direction while setting the tension of the dental floss 114. The ratchet pawl 127 is configured to prevent the user from winding the used dental floss 114 back on to the first spool 108.

Figure 2:
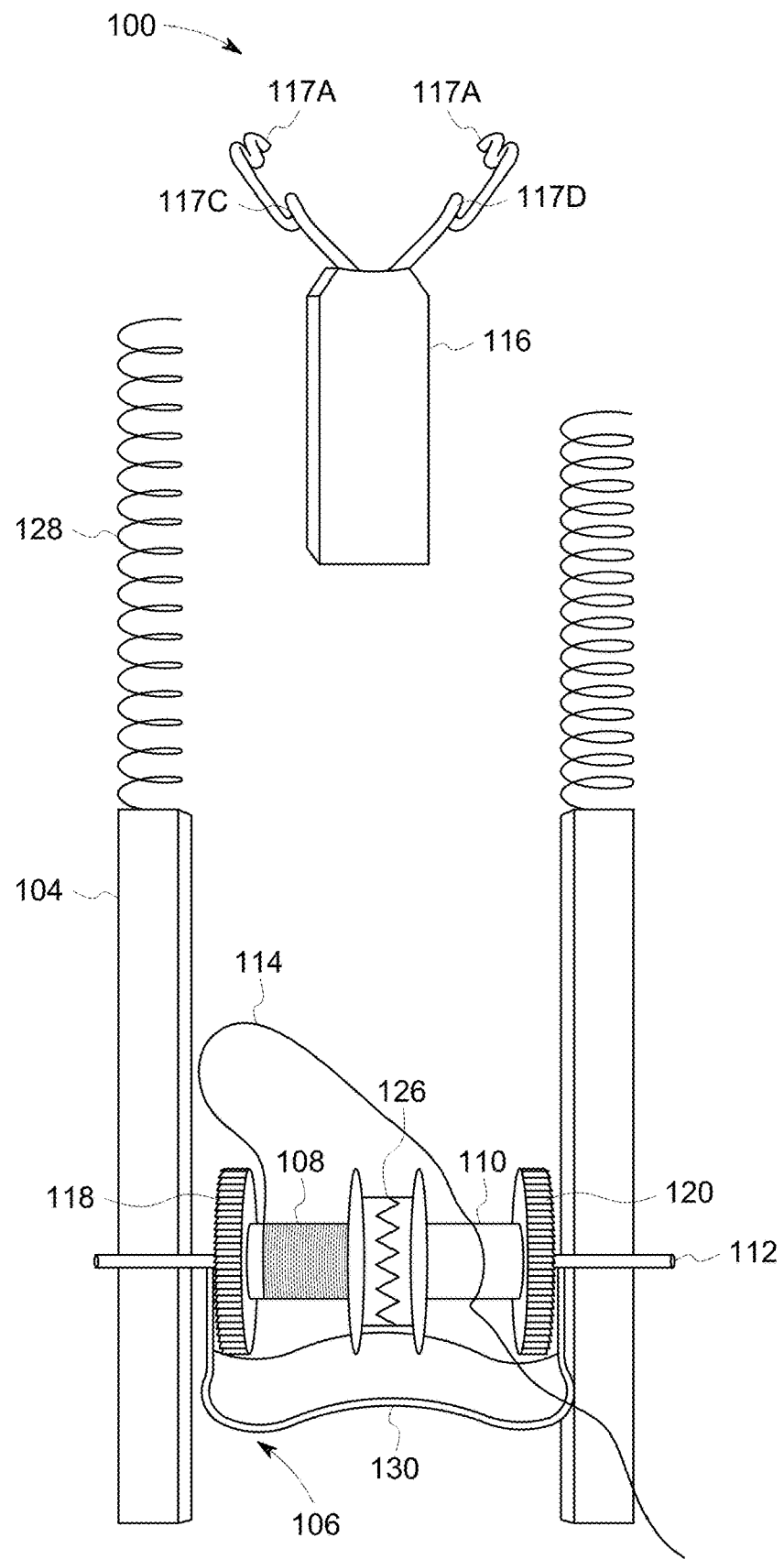
FIG. 2 illustrates an exploded view of the hand-held dental flossing device, in accordance with embodiments of the invention.

FIG. 2 refers to an exploded view of the hand-held dental flossing device 100. In one embodiment herein, the case member 107 on the floating platform 106 is opened and the used spools are removed and recycled/discarded. The floating platform 106 contains the first spool 108 having the dental floss 114 and the second spool 110 where the used dental floss 114 will reside. The first spool 108 is configured dispense the dental floss 114 and the second spool 110 is configured to collect the used dental floss 114. The dental floss 114 is partially attached to the second spool 110 that is empty. Next a short length of the dental floss 114 is pulled from the first spool 108 towards the head 116 and guided into the plurality of arms 117 on each side of the head 116. Piglet mechanism is used for securing the dental floss 114 in all directions of pull.

After feeding the dental floss 114 from the first spool 108, the user is ready to adjust the tension of the dental floss 114. The user adjusts the tension of the dental floss 114 by grabbing and holding the at least one knurled disc 118 of the first spool 108 and turning the at least one knurled disc 120 of the second spool 110 in at least one direction as the first spool 108 dispense the dental floss 114.

In one embodiment herein, the hand-held dental flossing device 100 is operated and controlled by the user manually by the hand, where palm and outer fingers of the hand hold the body 102, and center fingers of the hand hold the floating platform 106. The tension of the dental floss 114 is controlled by the user's hand during the flossing process. While flossing the teeth, the pulling action increases the tension of the dental floss 114 giving the user full control feeling. The hand-held dental flossing device 100 allows the user to use frequently and the hand-held dental flossing device 100 enables the user to load and replace the first and second spools (108, 110) easily.

Figure 3A:
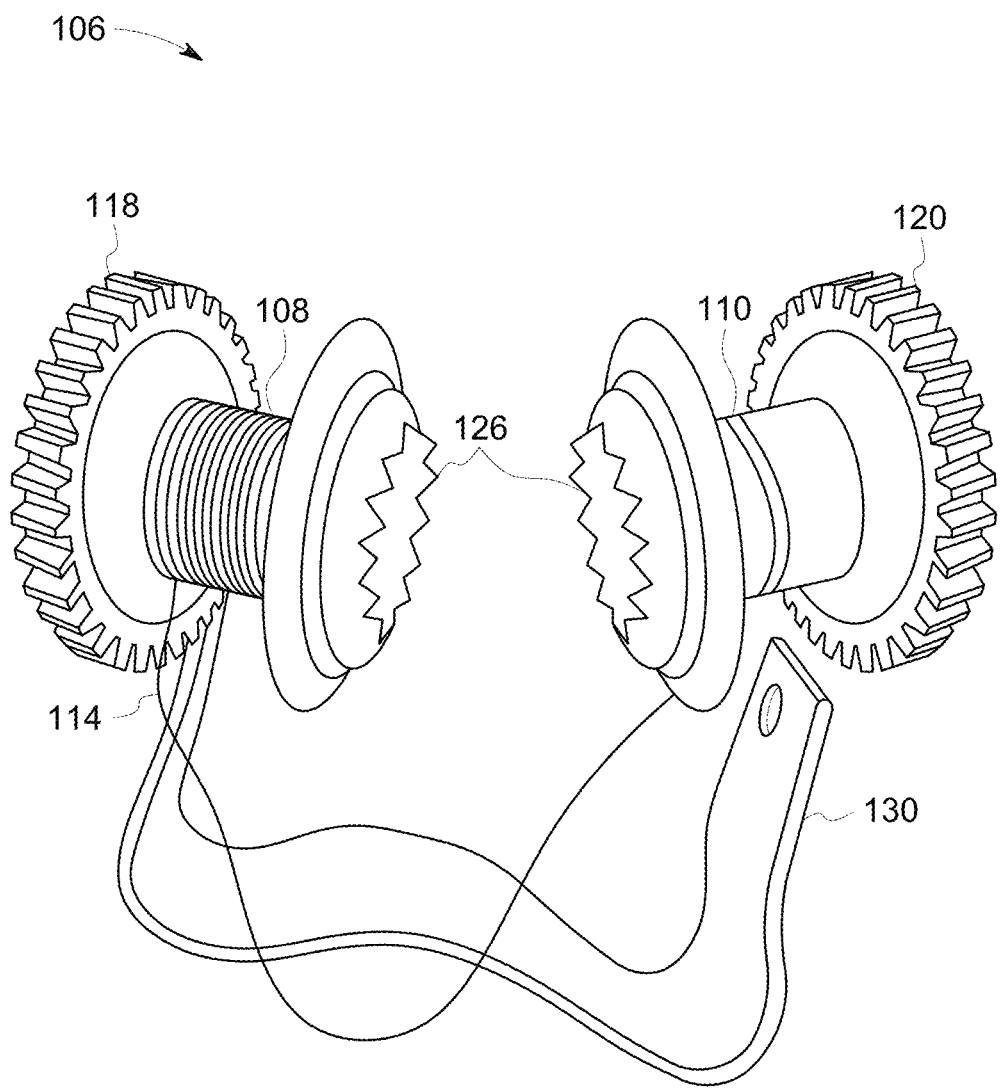
FIG. 3A illustrates a detailed view of a floating platform of the hand-held dental flossing device, in accordance with embodiments of the invention.
Figure 3B:
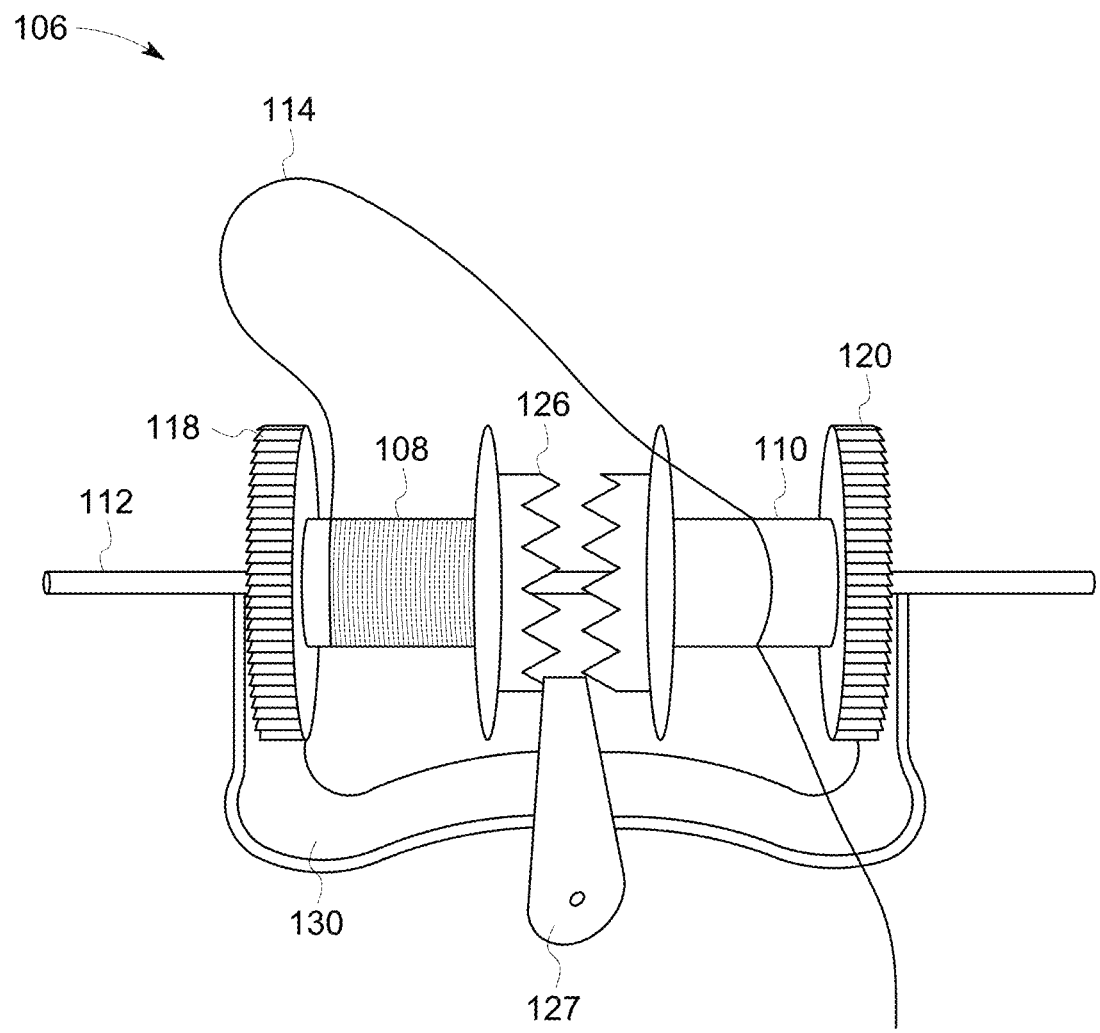
FIG. 3B illustrates a schematic view of the floating platform of the hand-held dental flossing device, in accordance with embodiments of the invention.

FIG. 3A refers to a detailed view of the floating platform 106 of the hand-held dental flossing device 100. In one embodiment herein, the knurled disc (118, 120) of the first spool 108 and the second spool 110 will protrude through the case member 107 that protects or hides the first spool 108 and the second spool 110 allowing the user to grip the top and bottom of each knurled disc (118, 120), thereby permitting easy turning to the knurled disc (118, 120) of the first spool 108 and the second spool 110.

FIG. 3B refers to schematic view of the floating platform 106 of the hand-held dental flossing device 100. In one embodiment herein, the floating platform 106 has the ability to take out any stretching of the dental floss 114 and prevents tangling and shedding of the dental floss 114 in order to maintain a constant tension. The first spool 108 and the second spool 110 are rotatably connected to each other on the axle 112 through the clutch system 126, thereby controlling a tension of the dental floss 114 at the head 116 where the user flossing the teeth upon rotation of the first spool 108 and the second spool 110, respectively. In one embodiment herein, the clutch system 126 is the slipper clutch the clutch system is connected to the ratchet pawl 127, which is used to limit rotational motion of the at least one of the first spool 108 and the second spool 110 in a direction while setting the tension of the dental floss 114.

Figure 4A:
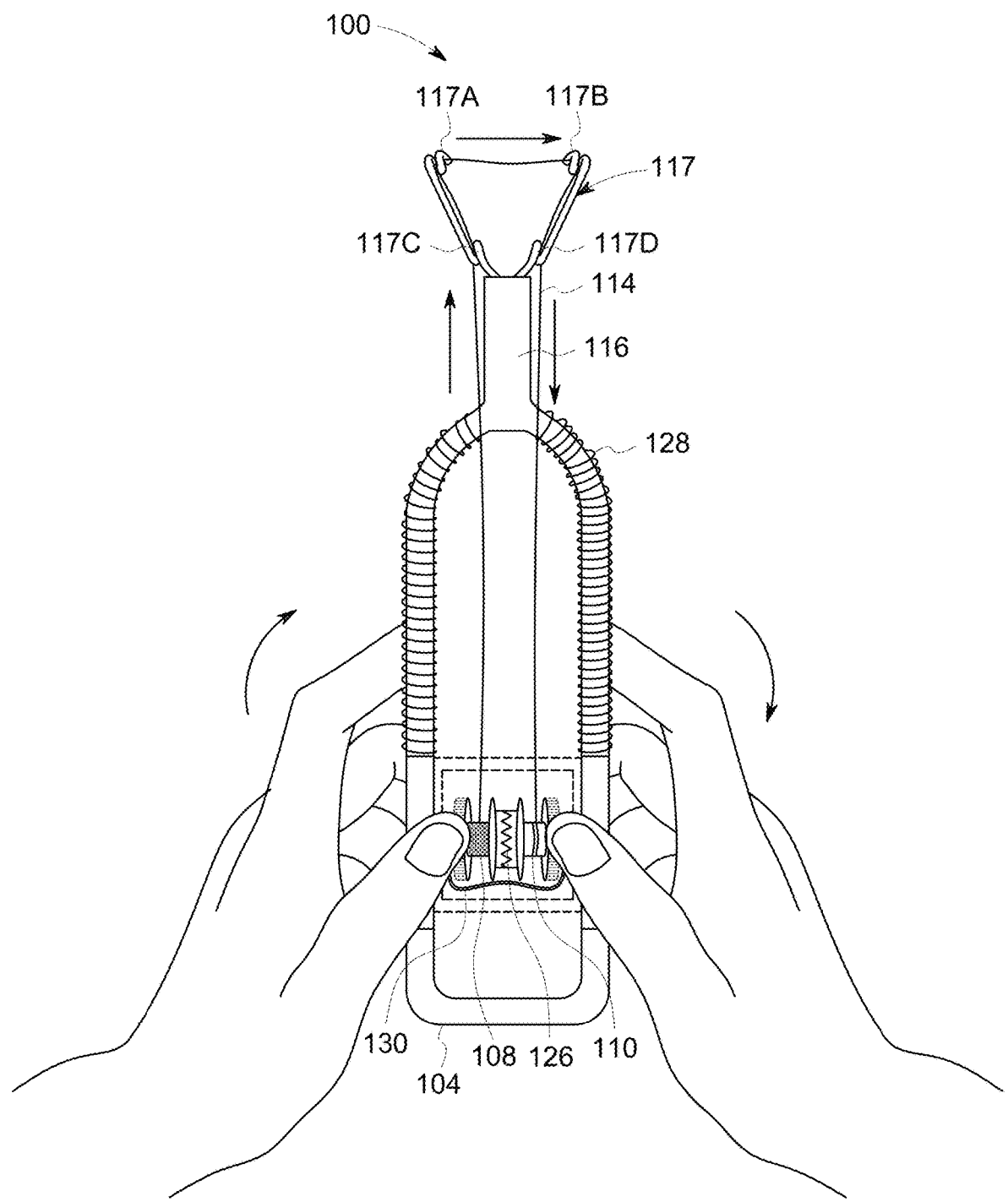
FIG. 4A illustrates a schematic view of the hand-held dental flossing device dispensing new dental floss when operated by a user, in accordance with embodiments of the invention.

FIG. 4A refers to a schematic view of the hand-held dental flossing device 100 dispensing new dental floss 114 when operated by the user. In one embodiment herein, the user rotates the first spool 108 and the second spool 110 together, then the dental floss 114 at the head 116 is changed with a new dental floss. The length of the dental floss 114 dispensed from the first spool 108 is equal to the dental floss 114 removed from the second spool 110. The tension of the dental floss 114 is maintained constantly during the flossing of teeth by rotating the first spool 108 and the second spool 110.

Figure 4B:
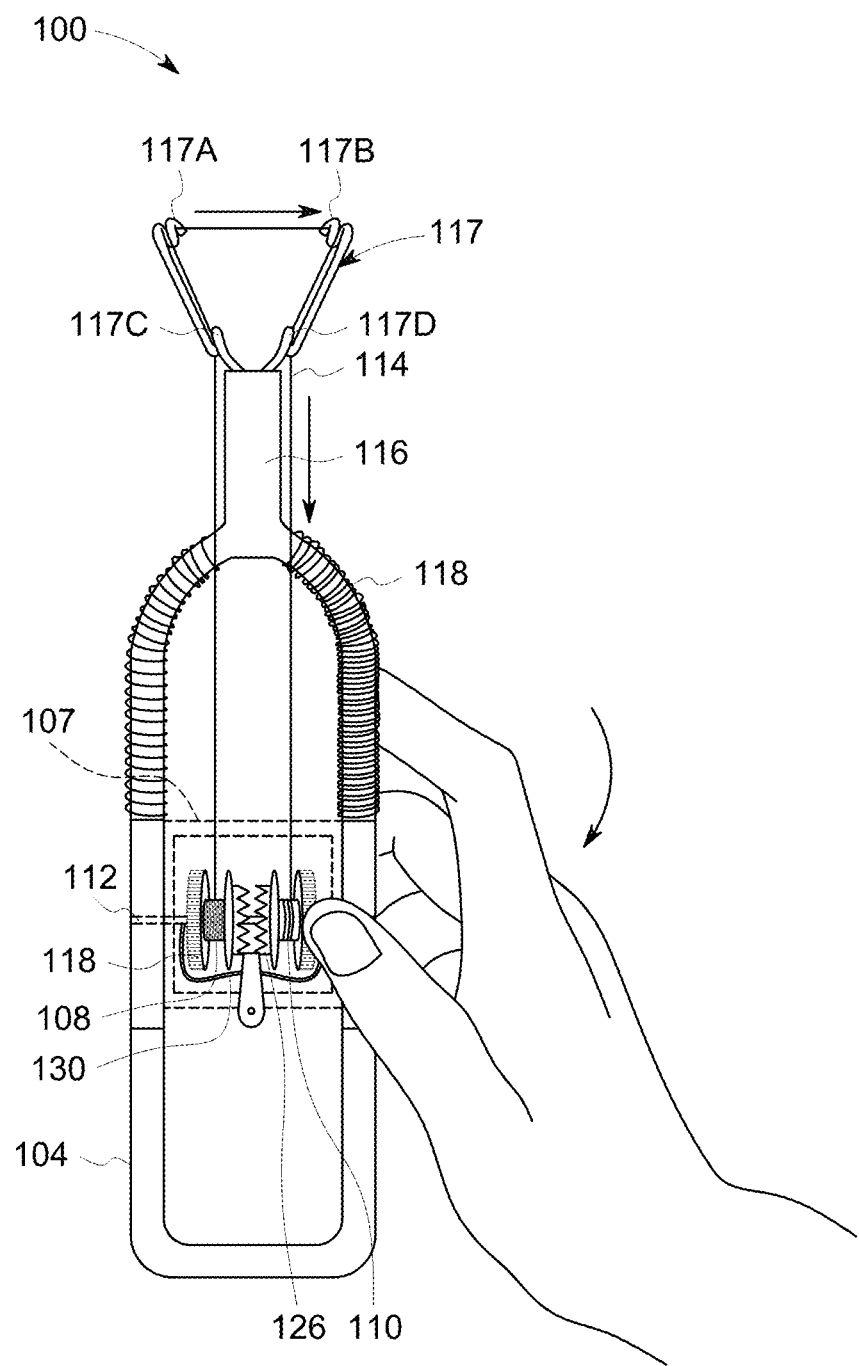
FIG. 4B illustrates a schematic view of the hand-held dental flossing device operated by the user in order to increase the tension of the dental floss, in accordance with embodiments of the invention.

FIG. 4B refers to a schematic view of the hand-held dental flossing device 100 operated by the user in order to increase the tension of the dental floss 114. In one embodiment herein, the user holds the first spool 108 and rotates the second spool 110 via the clutch system 126. The length of the dental floss 114 at the head 116 decreases by increasing the tension while moving the floating platform 106 closer to the head 116 through the elastic members 128.

Figure 4C:
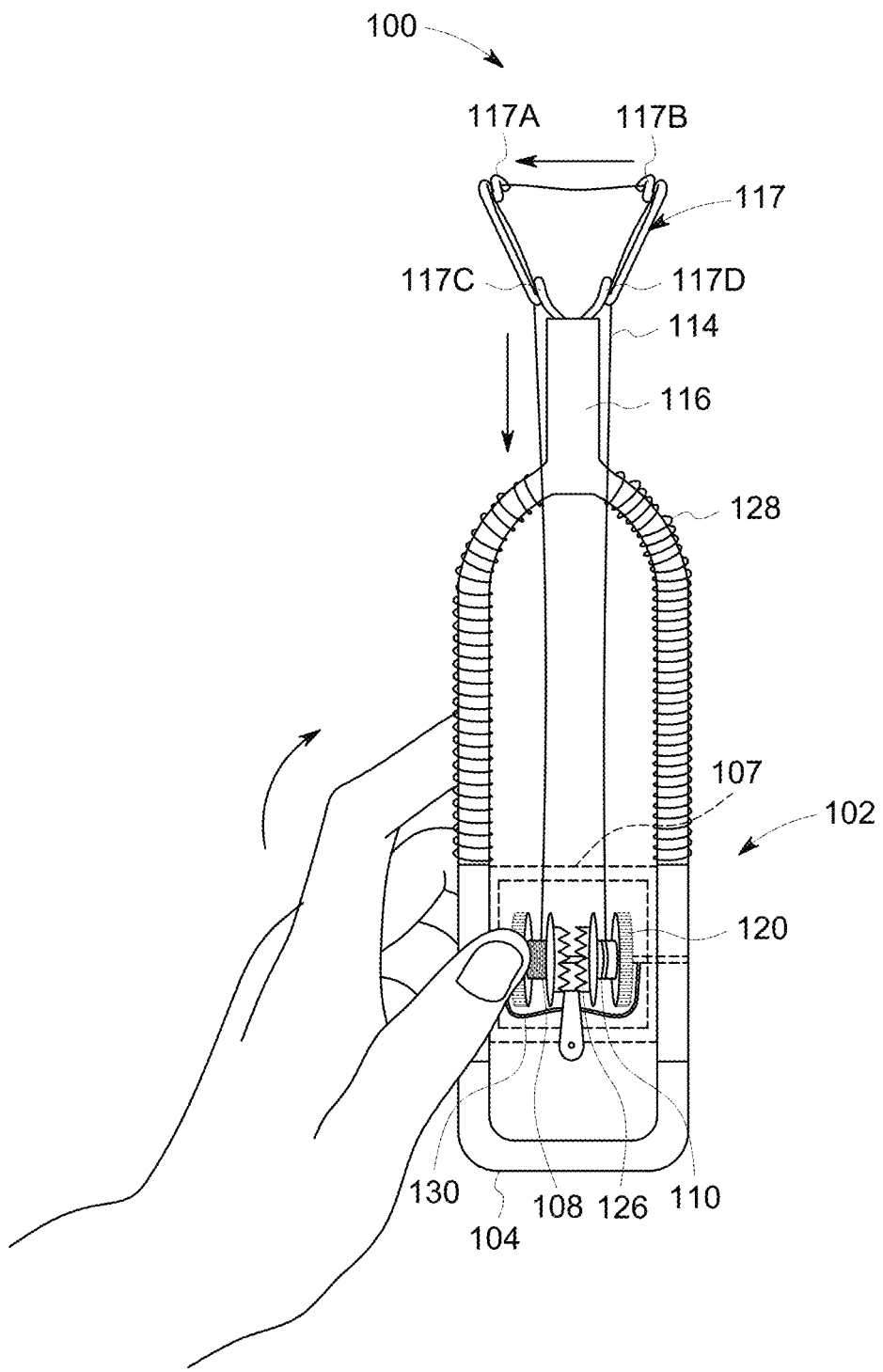
FIG. 4C illustrates a schematic view of the hand-held dental flossing device operated by the user in order to decrease the tension of the dental floss, in accordance with embodiments of the invention.

FIG. 4C refers to a schematic view of the hand-held dental flossing device 100 operated by the user in order to decrease the tension of the dental floss 114. In one embodiment herein, the user holds the second spool 110 and rotates the first spool 108 via the clutch system 126. The floating platform 106 is configured to move through said handle away from said head 116 when the user rotates said first spool 108 while holding said second spool 110 stationary, thereby decreasing the tension on the dental floss at said head. The ratchet pawl 127 is configured to prevent the user from winding the used dental floss 114 back on to the first spool 108.

Figure 5:
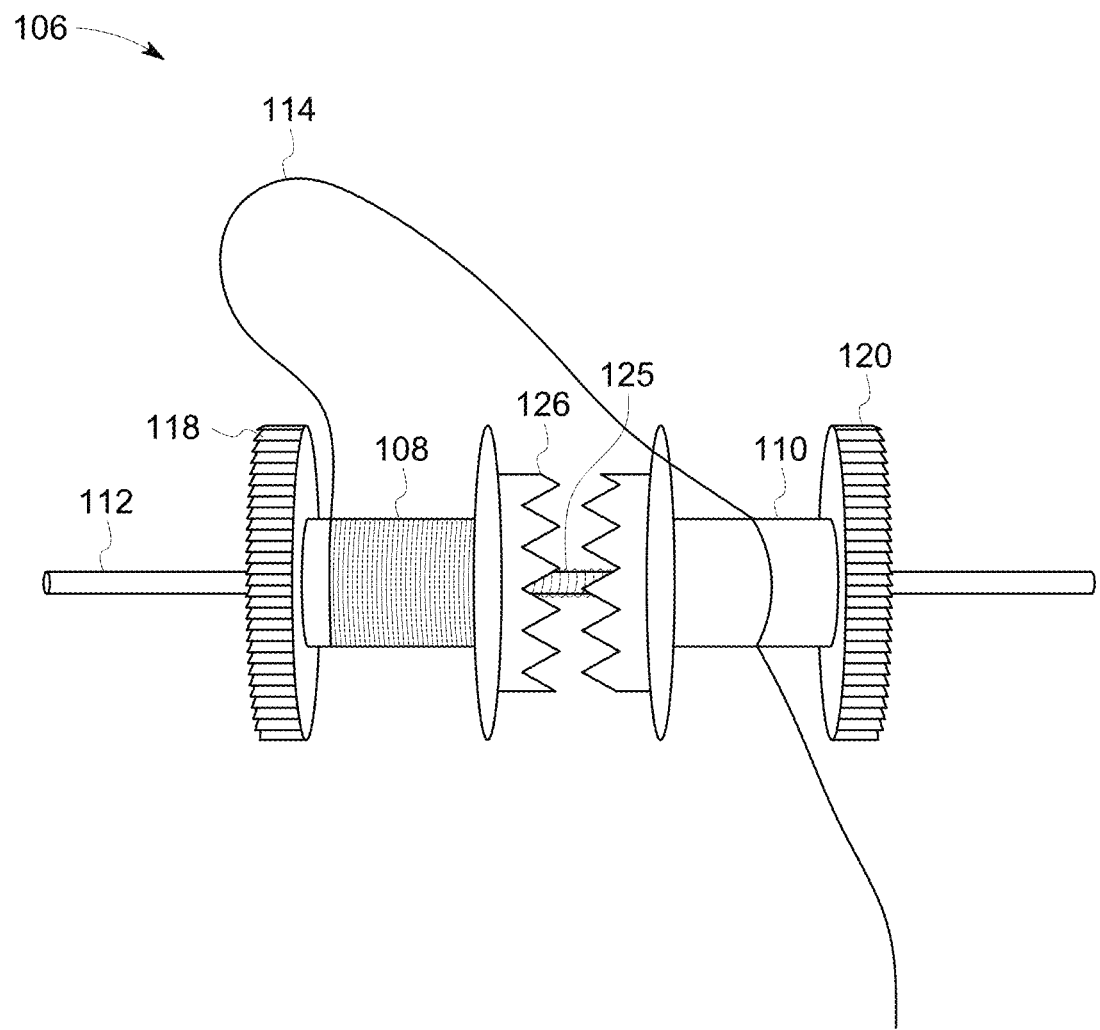
FIG. 5 illustrates a schematic view of the floating platform of the hand-held dental flossing device attached with a spring to engage the clutch system, in accordance with embodiments of the invention.

FIG. 5 refers to a schematic view of the floating platform 106 of the hand-held dental flossing device 100 attached with a spring 125 to engage the clutch system 126. In another embodiment herein, the floating platform 106 comprises a spring 125, which is flexibly connected between the axle 112 and the first spool 108, the second spool 110. The spring 125 is configured to engage the clutch system 126 when the user applies pressure on both sides of the floating platform 106. In another embodiment herein, the spring 125 replaces the clip fastener 130 (FIG. 4C), thereby providing a space around the first spool 108 and the second spool 110.

Figure 6:
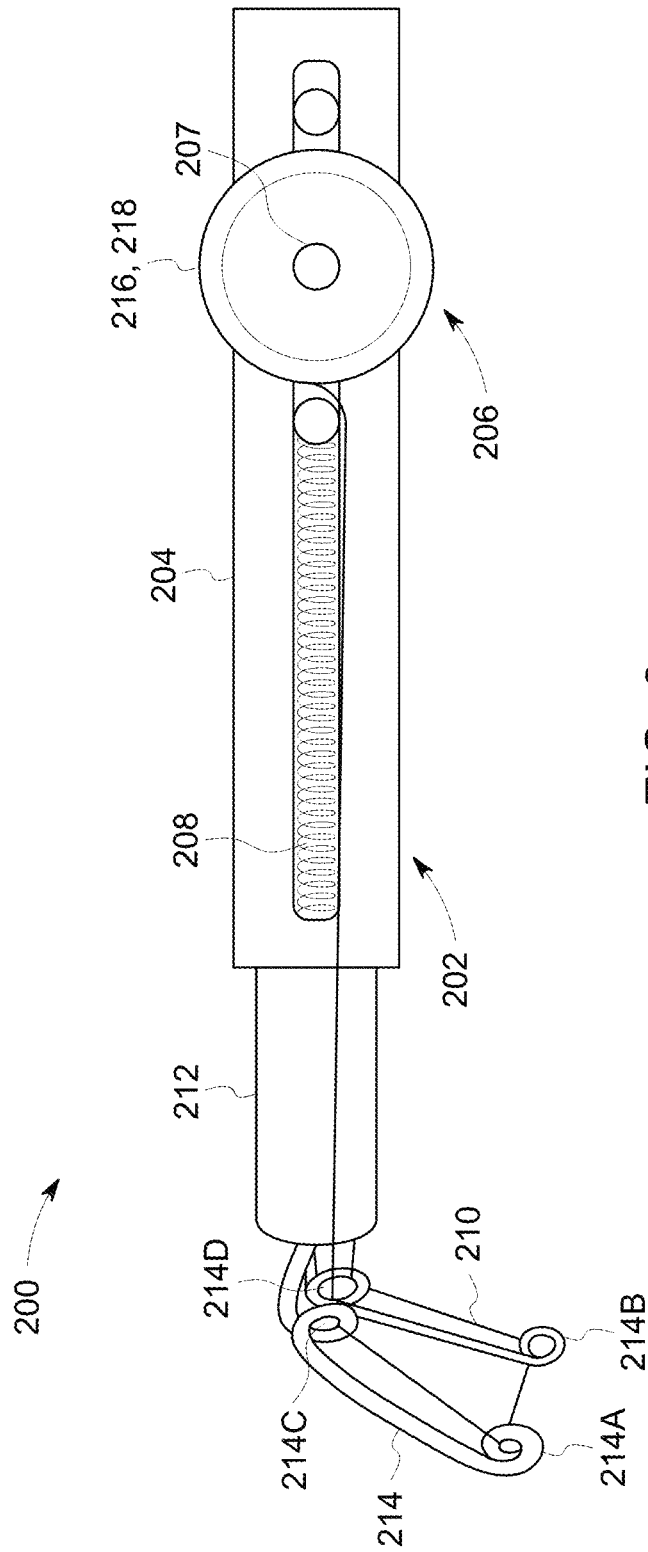
FIG. 6 illustrates a side view of the hand-held dental flossing device with a single split handle, in accordance with embodiments of the invention.

FIG. 6 refers to a side view of the hand-held dental flossing device 200 with single split handle 204. In another embodiment herein, the hand-held dental flossing device 200 comprises a body 202, a floating platform 206, and a head 212. In one embodiment herein, the body 202 having a handle 204 with a groove. The head 212 is configured with plurality of arms 214 pivotally affixed to an end of the handle 204. The handle 204 comprises a scale, which facilitates the user to adjust the tension of the dental floss 210 at various levels. The scale includes a minimum tension mode, a nominal tension mode, and a maximum tension mode.

In one embodiment herein, the plurality of arms 214 comprises one or more closed loops (214A, 214B, 214C, 214D) to facilitate a passage of a dental floss 210, which is used for flossing of teeth. The plurality of arms 214 is made of at least one material includes stainless-steel. The plurality of arms 214 is coated with silicone, which provides comfort to the user during the flossing of teeth.

In one embodiment herein, the floating platform 206 configured to movably position on the handle 204 through an axle 207 via the groove, thereby providing support for the floating platform 206 by the handle 204. In one embodiment herein, the floating platform 206 comprises a first spool 216, and a second spool 218.

In one embodiment herein, the floating platform 206 comprises a clip fastener, which is configured to hold the first spool 216, the clutch system, and the second spool 218 together on the axle 207 by applying pressure on both sides of the floating platform 206. The floating platform 206 is detachably positioned on the handle 204, thereby allowing the user to simply load and replace the first spool 216 with the dental floss 210 and the second spool 218.

In one embodiment herein, the first spool 216 is rotatably mounted on the axle 207 at one side of the handle 204. The first spool 216 is configured for winding the dental floss 210 for discharging upon rotation by a user. The second spool 218 is rotatably mounted on the axle 207 at another side of the handle 204. The second spool 218 is adapted to secure a free end of the dental floss 210 received from the first spool 216 through the one or more closed loops (214A, 214B, 214C, 214D) and wind a used portion of the dental floss 210 upon rotation of the first spool 216 and the second spool 218 simultaneously by the user.

In one embodiment herein, each of the first spool 216 and the second spool 218 comprise a knurled disc, which facilitates the user to manually rotate and hold the first spool 216 and the second spool 218. Each of the knurled disc of the first spool 216 and the second spool 218 enable user to grip and rotate the first spool 216 and the second spool 218.

In one embodiment herein, the first spool 216 and the second spool 218 are rotatably connected to each other on the axle 207 through a clutch system, thereby controlling a tension of the dental floss 210 at the head 212 where the user flossing the teeth upon rotation of the first spool 216 and the second spool 218, respectively.

In one embodiment herein, the clutch system is a slipper clutch. The clutch system is connected to a ratchet pawl, which is used to limit rotational motion of the at least one of the first spool 216 and the second spool 218 in a direction while setting the tension of the dental floss 210.

In one embodiment herein, the floating platform 206 is adapted to move through the groove of the handle 204 towards the head 212 against an elastic member 208 disposed within the groove when the user increasing and decreasing the tension of the dental floss 210 at the head 212 by rotating the second spool 218 and holding the first spool 216, and by rotating the first spool 216 and holding the second spool 218. In one embodiment herein, the elastic member 208 is configured to provide and maintain an equal tension of the dental floss 210 at the head 212 of the hand-held dental flossing device 200, thereby preventing shedding and tangling of the dental floss 210. In one embodiment herein, the elastic member 208 is a spring. The hand-held dental flossing device 200 enables the user to control the tension of the dental floss 210 at various modes by operating the first spool 216 and the second spool 218.

Figure 7:
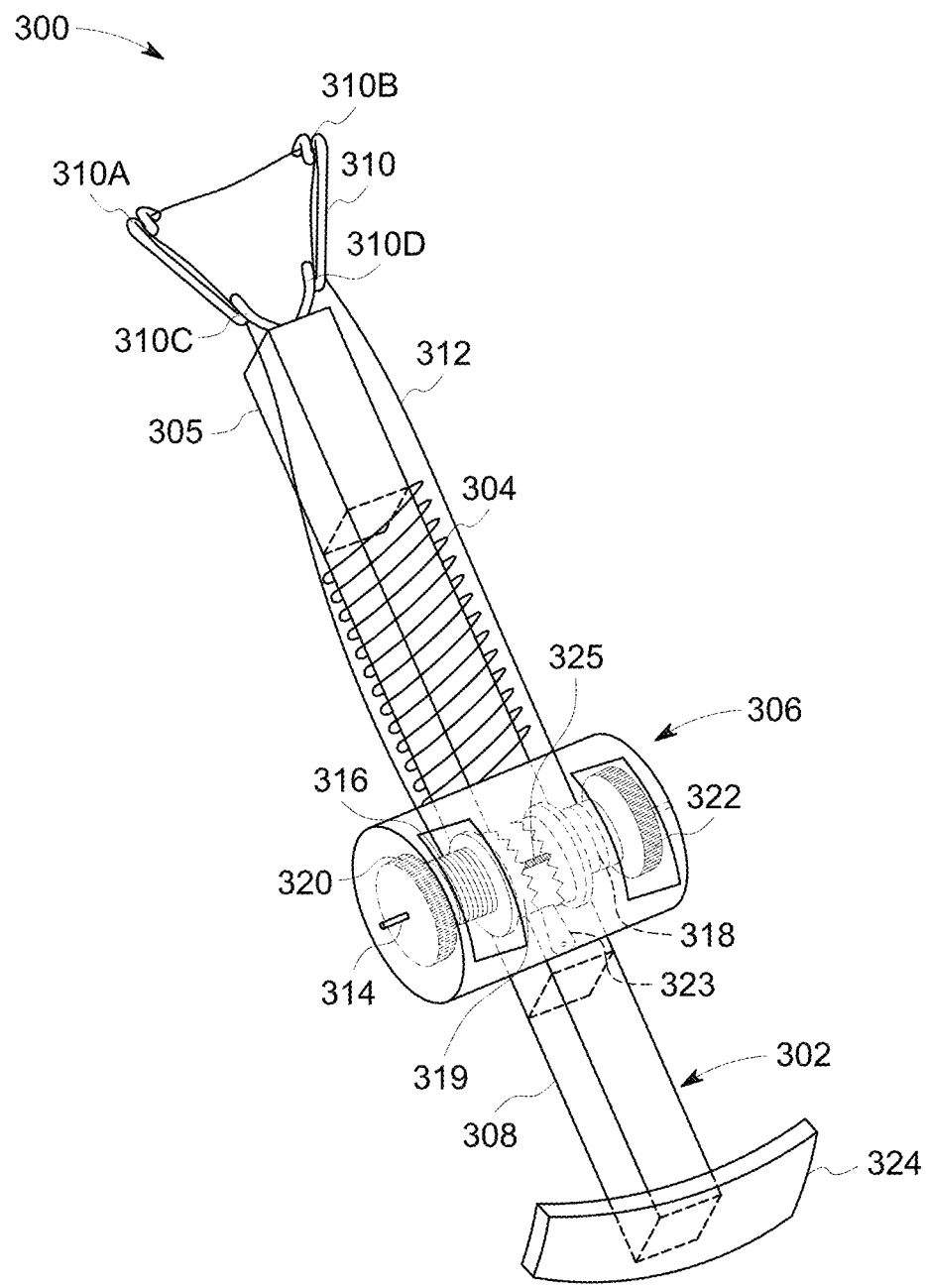
FIG. 7 illustrates a perspective view of the hand-held dental flossing device with a square solid core center design, in accordance with embodiments of the invention.

FIG. 7 refers to a perspective view of the hand-held dental flossing device 300 with a square solid core center design. In another embodiment herein, the hand-held dental flossing device 300 comprises a solid core member 302, an elastic member 304, a head 305 and a floating platform 306. In one embodiment herein, the solid core member 302 having a handle 308. In one embodiment herein, the solid core member 302 could be in square, circular, rectangular or other regular shapes. The head 305 is configured with plurality of arms 310 pivotally affixed to an end of the handle 308.

In one embodiment herein, the plurality of arms 310 comprises one or more closed loops (310A, 310B, 310C, 310D) to facilitate a passage of a dental floss 312, which is used for flossing of the teeth. The plurality of arms 310 is made of at least one material includes stainless-steel. The plurality of arms 310 is coated with silicone, which provides comfort to the user during the flossing of teeth.

In one embodiment herein, the floating platform 306 configured to movably position on the handle 308 through an axle 314, thereby providing support for the floating platform 306 by the handle 308. In one embodiment herein, the floating platform 306 comprises a first spool 316, and a second spool 318. The floating platform 306 is detachably positioned on the handle 308, thereby allowing the user to simply load and replace the first spool 316 with the dental floss 312 and the second spool 318.

In one embodiment herein, the first spool 316 is rotatably mounted on the axle 314 at one side of the handle 308. The first spool 316 is configured for winding the dental floss 210 for discharging upon rotation by a user. The second spool 318 is rotatably mounted on the axle 314 at another side of the handle 308. The second spool 318 is adapted to secure a free end of the dental floss 312 received from the first spool 316 through the one or more closed loops (310A, 310B, 310C, 310D) and wind a used portion of the dental floss 312 upon rotation of the first spool 316 and the second spool 318 simultaneously by the user.

In one embodiment herein, each of the first spool 316 and the second spool 318 comprise a knurled disc (320, 322), which facilitates the user to manually rotate and hold the first spool 316 and the second spool 318. Each of the knurled disc (320, 322) of the first spool 316 and the second spool 318 enable user to grip and rotate the first spool 316 and the second spool 318.

In one embodiment herein, the first spool 316 and the second spool 318 are rotatably connected to each other on the axle 314 through a clutch system 319, thereby controlling a tension of the dental floss 312 at the head 305 where the user flossing the teeth upon rotation of the first spool 316 and the second spool 318, respectively.

In one embodiment herein, the clutch system 319 is a slipper clutch. The clutch system 319 is connected to a ratchet pawl 323, which is used to limit rotational motion of the at least one of the first spool 316 and the second spool 318 in a direction while setting the tension of the dental floss 312.

In one embodiment herein, the floating platform 306 is adapted to move towards the head 305 against an elastic member 304 mounted externally around the solid core member 302 when the user increasing and decreasing the tension of the dental floss 312 at the head 305 by rotating the second spool 318 and holding the first spool 316, and by rotating the first spool 316 and holding the second spool 318. In one embodiment herein, the elastic member 304 is configured to provide and maintain an equal tension of the dental floss 312 at the head 305 of the hand-held dental flossing device 300, thereby preventing shedding and tangling of the dental floss 312. In one embodiment herein, the hand-held dental flossing device 300 enables the user to control the tension of the dental floss 312 at various modes by operating the first spool 316 and the second spool 318.

In another embodiment herein, the floating platform 306 comprises a spring 325, which is flexibly connected between the axle 314 and the first spool 316, the second spool 318. The spring 325 is configured to engage the clutch system 319 when the user applies pressure on both sides of the floating platform 306.

In one embodiment herein, the handle is supported with a palm rest 324, which is configured to aid the user to grip and rest his/her palm on the handle 308, while flossing the teeth. In one embodiment herein, the solid core member 302 terminates any rotational tendencies of the first spool 316 and the second spool 318 during the movement of the floating platform 306. The hand-held dental flossing device 300 reduces the complexity in design with less number of components. The design of the hand-held dental flossing device 300 makes the replacement of the first spool 316, the second spool 318 easy and simple.

Figure 8:
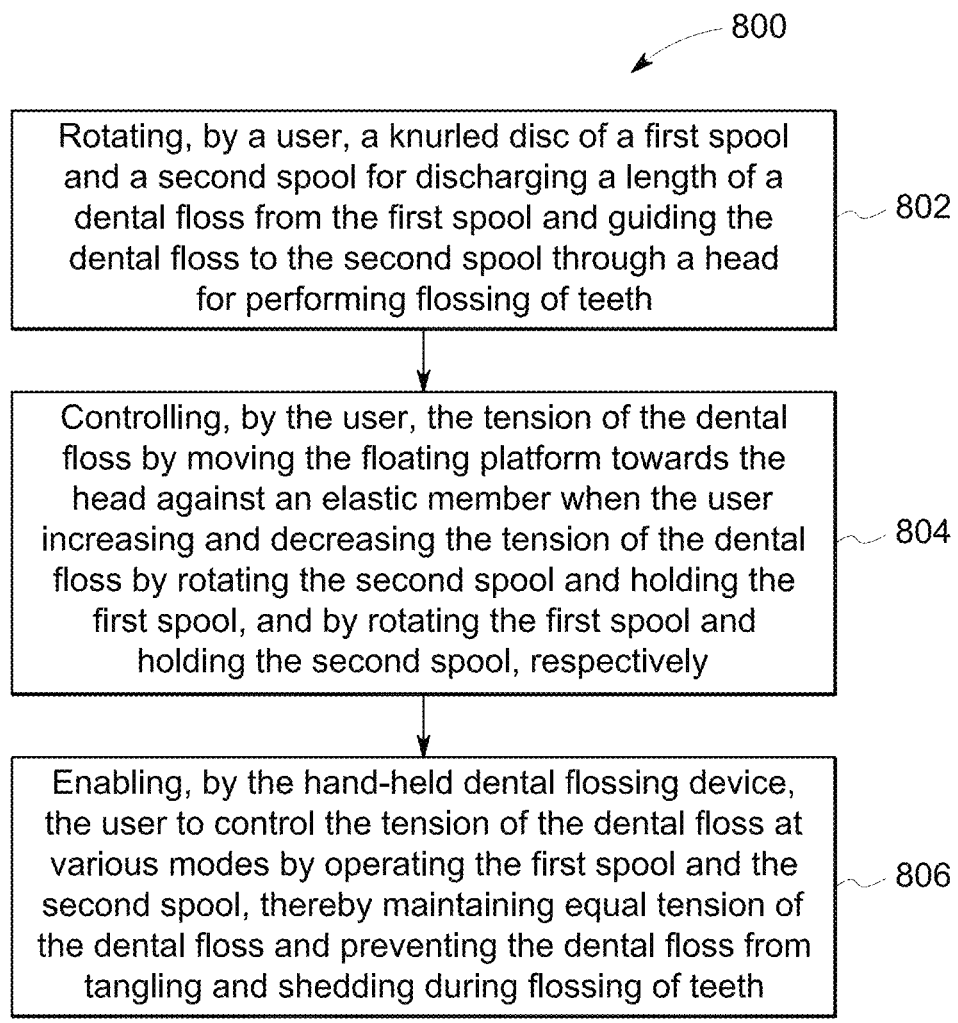
FIG. 8 illustrates a flowchart of a method for operating the hand-held dental flossing device, in accordance with embodiments of the invention.

FIG. 8 refers to a flowchart 800 of a method for operating the hand-held dental flossing device 100 for flossing of teeth. At step 802, the user rotates the knurled disc (118, 120) of the first spool 108 and the second spool 110 for discharging a length of the dental floss 114 from the first spool 108 and guiding the dental floss 114 to the second spool 110 through the head 116 for performing flossing of teeth.

At step 804, the user controls the tension of the dental floss 114 by moving the floating platform 106 towards the head 116 against the elastic member 128 when the user increases and decreases the tension of the dental floss 114 by rotating the second spool 110 and holding the first spool 108, and by rotating the first spool 108 and holding the second spool 110, respectively.

At step 806, the hand-held dental flossing device 100 enables the user to control the tension of the dental floss 114 at various modes by operating the first spool 108 and the second spool 110, thereby maintaining equal tension of the dental floss 114 and preventing the dental floss 114 from tangling and shedding during flossing of teeth.

Modifications and improvements of the present invention will be apparent to those skilled in the art. For example, the handle 104 can be split into one or more supporting members, thereby allowing the user to hold and grip the hand-held dental flossing device 100 during flossing of the teeth. The dental floss 114 could be any material made of nylon, polytetrafluoroethylene (PFTE), silk, or any other material and selected based on the user preference.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principles of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

It will readily be apparent that numerous modifications and alterations can be made to the processes described in the foregoing examples without departing from the principles underlying the invention, and all such modifications and alterations are intended to be embraced by this application.

The claimed invention is:

1. A hand-held dental flossing device, comprising:
a body having a handle, wherein said handle has a curved structure;
a head with plurality of arms pivotally affixed to an end of said handle, wherein each arm of said plurality of arms comprises one or more closed loops to facilitate a passage of a dental floss, which is used for flossing of teeth;
a floating platform configured to movably position on said handle through an axle, thereby providing support for said floating platform by the handle,
wherein said floating platform comprises:
a case member defining a chamber;
a first spool with the dental floss rotatably mounted on said axle at one side within said chamber, wherein said first spool is configured for unwinding the dental floss for discharging the new floss through the head upon rotation by a user;
a second spool rotatably mounted on said axle at another side within said chamber, wherein said second spool is adapted to secure a free end of the dental floss received from the first spool through said one or more closed loops and wind a used portion of said dental floss upon rotation of said second spool by the user,
wherein
said first spool and said second spool are rotatably connected to each other on the axle through a clutch system, thereby controlling a tension of the dental floss at said head where the user flosses the teeth through rotation of either said first spool or said second spool, individually,
said floating platform is adapted to move through said handle towards said head against an elastic member mounted on an outer surface of said handle when the user rotates said second spool while holding said first spool stationary, thereby increasing the tension on the dental floss at said head, and said floating platform is further configured to move through said handle away from said head when the user rotates said first spool while holding said second spool stationary, thereby decreasing the tension on the dental floss at said head, whereby said hand-held dental flossing device enables the user to control the tension of the dental floss to different tension levels by operating said first spool and said second spool.

2. The hand-held dental flossing device of claim 1, wherein the clutch system is a slipper clutch, and wherein said clutch system is connected to a ratchet pawl, which is used to limit rotational motion of said at least one of said first spool and said second spool in a direction while setting the tension of said dental floss.

3. The hand-held dental flossing device of claim 1, wherein each of said first spool and said second spool comprise a knurled disc, which facilitates the user to rotate and hold said first spool and said second spool.

4. The hand-held dental flossing device of claim 3, wherein each of said knurled disc of said first spool and said second spool is protruded from said case member.

5. The hand-held dental flossing device of claim 1, wherein said floating platform comprises a clip fastener, which is configured to hold said first spool, said clutch system, and said second spool together on said axle by applying pressure on both sides of said floating platform.

6. The hand-held dental flossing device of claim 1, wherein said floating platform is detachably positioned to said handle, thereby allowing the user to simply load and replace said first spool with the dental floss and said second spool.

7. The hand-held dental flossing device of claim 1, wherein said plurality of arms is made of at least one material including stainless-steel, and wherein said plurality of arms is coated with silicone, which provides comfort to the user during the flossing of teeth.

8. The hand-held dental flossing device of claim 1, wherein said handle is a split-handle and having at least one of straight, curved or U-shaped structures, wherein said handle is configured to provide grip to the user for holding while using said hand-held dental flossing device.

9. The hand-held dental flossing device of claim 1, wherein the elastic members are configured to provide and maintain an equal tension of the dental floss at said head of said hand-held dental flossing device, thereby preventing tangling of the dental floss, and wherein said elastic members are non-linear springs.

10. The hand-held dental flossing device of claim 1, wherein the handle comprises a scale, which facilitates the user to adjust the tension of the dental floss to various levels, and wherein said scale includes a minimum tension mode, a nominal tension mode, and a maximum tension mode.

11. A hand-held dental flossing device, comprising:

a body having a handle, wherein said handle has a groove;

a head with plurality of arms pivotally affixed to an end of said handle, wherein each arm of said plurality of arms comprises one or more closed loops to facilitate a passage of a dental floss, which is used for flossing of teeth;

a floating platform configured to movably position on said handle through an axle via said groove, thereby providing support for said floating platform by the handle, wherein said floating platform comprises:

a first spool with the dental floss rotatably mounted on said axle at one side of said handle, wherein said first spool is configured and unwinding the dental floss for discharging the new floss through the head upon rotation by a user;

a second spool rotatably mounted on said axle at another side of said handle, wherein said second spool is adapted to secure a free end of the dental floss received from the first spool through said one or more closed loops and wind a used portion of said dental floss upon rotation of said second spool by the user, wherein said first spool and said second spool are rotatably connected to each other on the axle through a clutch system, thereby controlling a tension of the dental floss at said head where the user flosses the teeth through rotation of either said first spool or said second spool, individually, said floating platform is adapted to move through the groove of said handle towards said head against an elastic member disposed within said groove when the user rotates said second spool while holding said first spool stationary, thereby increasing the tension on the dental floss at said head, and said floating platform is further configured to move through said handle away from said head when the user rotates said first spool while holding said second spool stationary, thereby decreasing the tension on the dental floss at said head, whereby said hand-held dental flossing device enables the user to control the tension of the dental floss to different tension levels by operating said first spool and said second spool.

12. The hand-held dental flossing device of claim 11, wherein the clutch system is a slipper clutch, and wherein said clutch system is connected to a ratchet pawl, which is used to limit rotational motion of said at least one of said first spool and said second spool in a direction while setting the tension of said dental floss.

13. The hand-held dental flossing device of claim 11, wherein each of said first spool and said second spool comprise a knurled disc, which facilitates the user to manually rotate and hold said first spool and said second spool.

14. The hand-held dental flossing device of claim 11, wherein said floating platform comprises a clip fastener, which is configured to hold said first spool, said clutch system, and said second spool together on said axle by applying pressure on both sides of said floating platform.

15. The hand-held dental flossing device of claim 11, wherein said floating platform is detachably positioned on said handle, thereby allowing the user to simply load and replace said first spool with the dental floss and said second spool.

16. The hand-held dental flossing device of claim 11, wherein said plurality of arms is made of at least one material including stainless-steel, and wherein said plurality of arms is coated with silicone, which provides comfort to the user during the flossing of teeth.

17. The hand-held dental flossing device of claim 11, wherein the elastic member is configured to provide and maintain an equal tension of the dental floss at said head of said hand-held dental flossing device, thereby preventing shedding and tangling of the dental floss, wherein said elastic member is a spring.

18. The hand-held dental flossing device of claim 11, wherein the handle comprises a scale, which facilitates the user to adjust the tension of the dental floss at various levels, wherein said scale includes a minimum tension mode, a nominal tension mode, and a maximum tension mode.

19. A method for operating a hand-held dental flossing device, comprising:
- rotating, by a user, a knurled disc of a first spool with a dental floss for discharging and guiding the dental floss to a second spool through a head for flossing user's teeth;
- controlling, by the user, a tension of the dental floss at said head through rotation of either said first spool or said second spool individually,
- increasing, by the user, the tension on the dental floss at said head by moving a floating platform through said handle towards said head against an elastic member mounted on an outer surface of said handle when the user rotates said second spool while holding said first spool stationary;
- decreasing, by the user, the tension on the dental floss at said head by moving said floating platform away from said head when the user rotates said first spool while holding said second spool stationary;
- enabling, by the hand-held dental flossing device, the user to control the tension of the dental floss to different tension levels by operating the first spool and the second spool, thereby maintaining equal tension of the dental floss and preventing the dental floss from tangling and shedding during flossing of teeth.

* * * * *